(12) United States Patent
Grandcolas et al.

(10) Patent No.: US 8,146,141 B1
(45) Date of Patent: Mar. 27, 2012

(54) METHOD AND SYSTEM FOR SECURE AUTHENTICATION OF A USER BY A HOST SYSTEM

(75) Inventors: Michael Grandcolas, Santa Monica, CA (US); Marc Guzman, Studio City, CA (US); Thomas Yee, Northridge, CA (US); Dilip Parekh, Los Angeles, CA (US); Yongqiang Chen, Gardenia, CA (US)

(73) Assignee: Citibank Development Center, Inc., Los Angeles, CA (US)

( * ) Notice: Subject to any disclaimer, the term of this patent is extended or adjusted under 35 U.S.C. 154(b) by 1483 days.

(21) Appl. No.: 11/014,127

(22) Filed: Dec. 16, 2004

Related U.S. Application Data

(60) Provisional application No. 60/530,063, filed on Dec. 16, 2003.

(51) Int. Cl.
    *G06F 7/04*  (2006.01)
(52) U.S. Cl. .......................................... 726/5
(58) Field of Classification Search .................. 713/171; 726/5, 8; 380/277
    See application file for complete search history.

(56) References Cited

U.S. PATENT DOCUMENTS

| | | | |
|---|---|---|---|
| 4,259,720 A | 3/1981 | Campbell | 705/71 |
| 4,408,203 A | 10/1983 | Campbell | 705/71 |
| 4,423,287 A | 12/1983 | Zeidler | 705/71 |
| 4,578,530 A | 3/1986 | Zeidler | 705/71 |
| 4,995,112 A | 2/1991 | Aoyama | 726/6 |
| 5,241,594 A | 8/1993 | Kung | 713/151 |
| 5,671,354 A | 9/1997 | Ito et al. | 726/3 |
| 5,805,803 A | 9/1998 | Birrell et al. | 726/12 |
| 5,825,884 A * | 10/1998 | Zdepski et al. | 705/78 |
| 5,922,074 A | 7/1999 | Richard et al. | 726/21 |

(Continued)

FOREIGN PATENT DOCUMENTS

EP  0913789 A2  5/1999

(Continued)

OTHER PUBLICATIONS

Na, Z., et al., "Applications of Cookie on the Internet," *Computer Applications*, Sep. 1998, pp. 28-31, Hu Nan, Changsha, China, Abstract.

(Continued)

*Primary Examiner* — David Garcia Cervetti
*Assistant Examiner* — Daniel Hoang
(74) *Attorney, Agent, or Firm* — Johnson & Associates

(57) ABSTRACT

A method and system for securely logging onto a banking system authentication server so that a user credential never appears in the clear during interaction with the system in which during a log on process, an encryption applet and the public key of a public/private key pair of a banking application server, the private key for which is known by a hardware security module (HSM) of the banking application, are downloaded by a user's browser. The applet contains code for generating a DES key and performing DES and PKI encryption. A user's credential is DES encrypted, and the DES key is PKI encrypted with the public key of the application server by the applet before being transmitted to the application server. Within the HSM of the application server, the HSM decrypts and re-encrypts the credential under a new DES key known to the authentication server, the re-encrypted credential is forwarded to the authentication server, decrypted with the new DES key known to the authentication server, and verified by the authentication server.

16 Claims, 13 Drawing Sheets

U.S. PATENT DOCUMENTS

| | | | |
|---|---|---|---|
| 5,987,523 A | 11/1999 | Hind et al. | 709/245 |
| 5,991,399 A * | 11/1999 | Graunke et al. | 380/279 |
| 5,991,810 A | 11/1999 | Shapiro et al. | 709/229 |
| 5,999,711 A | 12/1999 | Misra et al. | 726/4 |
| 6,006,333 A | 12/1999 | Nielsen | 726/8 |
| 6,023,684 A | 2/2000 | Pearson | 705/36 R |
| 6,044,465 A | 3/2000 | Dutcher et al. | 726/13 |
| 6,049,877 A | 4/2000 | White | 726/5 |
| 6,052,785 A | 4/2000 | Lin et al. | 726/5 |
| 6,055,637 A | 4/2000 | Hudson et al. | 726/20 |
| 6,064,666 A | 5/2000 | Willner et al. | 370/352 |
| 6,067,623 A | 5/2000 | Blakley, III et al. | 726/5 |
| 6,085,320 A | 7/2000 | Kaliski, Jr. | 713/168 |
| 6,092,196 A | 7/2000 | Reiche | 726/6 |
| 6,154,543 A | 11/2000 | Baltzley | 380/255 |
| 6,189,098 B1 | 2/2001 | Kaliski, Jr. | 713/168 |
| 6,223,287 B1 | 4/2001 | Douglas et al. | 713/178 |
| 6,249,873 B1 | 6/2001 | Richard et al. | 726/4 |
| 6,256,733 B1 * | 7/2001 | Thakkar et al. | 713/156 |
| 6,263,432 B1 | 7/2001 | Sasmazel et al. | 713/100 |
| 6,292,895 B1 | 9/2001 | Baltzley | 713/168 |
| 6,421,768 B1 | 7/2002 | Purpura | 711/164 |
| 6,424,718 B1 | 7/2002 | Holloway | 380/277 |
| 6,438,600 B1 | 8/2002 | Greenfield et al. | 709/229 |
| 6,442,687 B1 | 8/2002 | Savage | 713/156 |
| 6,490,624 B1 | 12/2002 | Sampson et al. | 709/227 |
| 6,510,236 B1 * | 1/2003 | Crane et al. | 382/116 |
| 6,539,479 B1 | 3/2003 | Wu | 713/151 |
| 6,587,867 B1 | 7/2003 | Miller et al. | 709/200 |
| 6,606,663 B1 | 8/2003 | Liao et al. | 709/229 |
| 6,766,454 B1 | 7/2004 | Riggins | 713/185 |
| 2001/0014158 A1 | 8/2001 | Baltzley | 380/281 |
| 2001/0027519 A1 * | 10/2001 | Gudbjartsson et al. | 713/168 |
| 2001/0034721 A1 | 10/2001 | Boudreau et al. | 705/72 |
| 2002/0010679 A1 | 1/2002 | Felsher | 705/51 |
| 2002/0016910 A1 | 2/2002 | Wright et al. | 713/150 |
| 2002/0023213 A1 | 2/2002 | Walker et al. | 713/168 |
| 2002/0031225 A1 | 3/2002 | Hines | 380/247 |
| 2002/0064283 A1 | 5/2002 | Parenty | 380/277 |
| 2002/0071562 A1 | 6/2002 | Parenty | 380/278 |
| 2002/0099940 A1 | 7/2002 | Wang | 713/168 |
| 2002/0099942 A1 | 7/2002 | Gohl | 713/169 |
| 2002/0124170 A1 | 9/2002 | Johnson, Jr. | 713/176 |
| 2003/0033545 A1 * | 2/2003 | Wenisch et al. | 713/202 |
| 2003/0065791 A1 | 4/2003 | Garg et al. | 709/229 |
| 2003/0149653 A1 | 8/2003 | Penney et al. | 705/37 |
| 2003/0182576 A1 | 9/2003 | Morlang et al. | 713/171 |
| 2004/0111620 A1 | 6/2004 | Saunders et al. | 713/182 |
| 2004/0111644 A1 | 6/2004 | Saunders et al. | 726/8 |
| 2004/0123112 A1 | 6/2004 | Himmel et al. | 713/182 |
| 2004/0143738 A1 | 7/2004 | Savage et al. | 713/168 |
| 2005/0136979 A1 * | 6/2005 | Dietl et al. | 455/558 |

FOREIGN PATENT DOCUMENTS

| | | |
|---|---|---|
| EP | 0940960 | 9/1999 |
| JP | 10269184 | 10/1998 |
| JP | 11025048 | 1/1999 |
| JP | 2003-304237 | 10/2003 |
| WO | WO 99/20060 | 4/1999 |

OTHER PUBLICATIONS

European Search Report for Application No. EP 00 20 3266, dated Jul. 15, 2002 (mailing date).

Park, Joon S., "A Secure-Cookie Recipe for Electronic Transactions" [online], *Korea Conference (UKC) on Science, Technology, Entrepreneurship, and Leadership*, Aug. 12-14, 1999 [retrieved on Feb. 21, 2002], 8 pp., Retrieved from the Internet: http://citeseer.nj.nec.com/park99securecookie.html.

Park, Joon S., "Secure Attribute Services on the Web" [online], *George Mason University*, Fairfax, Virginia, Jun. 1999 [retrieved on Feb. 21, 2002], 121 pp., Retrieved from the Internet: http://www.list.gmu.edu/dissert/idss-jean.pdf.

Baird-Smith, Anselm, "Re: URLEncoder, where is the URLDecoder?" [online], *Internet Newsgroup*, Apr. 29, 1996 [retrieved on Feb. 21, 2002], 4 pp., Retrieved from the Internet: http://groups.google.com/>.

"Extranets Invigorate Single-Sign-On Security," *PC Week*, Aug. 23, 1999.

"Through the Looking Glass-House," *HP Professional*, vol. 11, No. 6, Jun. 1997.

"Cryptography is the Key to Intranet Security Needs," *Computer Reseller News*, No. 743, Jun. 30, 1997.

"Microsoft and Novell Compete in Creating Single Internet Sign-On for Your e-Shopping," *InfoWorld*, Nov. 15, 1999.

"CRYPTOCard Enables Companies and ISPs to Secure Intranet Access With Authentication Tokens at Much Lower Costs," *Business Wire*, Jun. 29, 1998.

Popek, G. J., et al., "Encryption and Secure Computer Networks," *Computing Surveys*, vol. 11, No. 4, pp. 331-356, Dec. 1979.

Gibbs, M., "WebConnect Pro: Integrating Intranets and Big Iron," *Network World*, vol. 14, No. 33, p. 18, Aug. 18, 1997.

Jenkin, M., et al., "A Plugin-Based Privacy Scheme for World-Wide Web File Distribution," *Proceedings of the Thirty-First Hawaii International Conference on System Sciences*, vol. 7, pp. 621-627, 1998.

Dymond, P., et al., "WWW Distribution of Private Information with Watermarking," *Proceedings of the 32$^{nd}$ Hawaii International Conference on System Sciences*, pp. 1-8, 1999.

"Hush Encryption Engine TM White Paper," Version 2.0, Hush Communications, Jul. 2001.

Dalton, M., "TruePass Assures a Safe Journey for Internet Transactions," *Network Computing*, vol. 13, No. 15, pp. 28-29, Jul. 22, 2002.

"PrivyLink Internet Application Security Environment—The End-to-End Security Solution for Internet Applications," PrivyLink International Ltd., Sep. 2003.

"The DS3 Authentication Solution on Sun," Solution Sheet, Sun Microsystems, 2004.

"DBS Bank's Security Practices," DBS Singapore, http://www.dbs.com/sg/personal/ebanking/additionalinfo/security/practices/ and "Security FAQ," DBS Singapore, http://www.dbs.com/sg/personal/ebanking/internet/additionalinfo/faq/security, 2004.

* cited by examiner

METHOD AND SYSTEM FOR SECURE AUTHENTICATION OF A USER BY A HOST SYSTEM

PRIORITY APPLICATION

This application claims the benefit of U.S. Provisional Application No. 60/530,063 filed Dec. 16, 2003, entitled "METHOD AND SYSTEM FOR SECURE AUTHENTICATION OF A USER BY A HOST SYSTEM", which is incorporated herein by this reference.

FIELD OF THE INVENTION

The present invention relates generally to the field of electronic commerce security, and more particularly to a method and system for allowing a user to securely log on to a host system via an electronic interface, such as an Internet banking interface.

BACKGROUND

Currently, Secure Sockets Layer (SSL) is typically utilized for log-on security in transmitting user credentials, including, without limitation, PINs, passwords, one-time passwords, biometrics, physical tokens, smart card tokens, security tokens, and the like (referred to hereinafter collectively as "PIN" and/or "user credentials" and/or "authentication credentials", and customer identification numbers (CINs), from a user's terminal to an authentication server via a network, such as the Internet. For example, in an existing art user credential flow process, a user enters his or her user credentials, such as a PIN, in the clear on a Web site login screen at the user's browser, and the PIN travels, for example, over SSL to the Web server and is momentarily in the clear in memory in the Web server. Thereafter, the PIN is forwarded to an application server over SSL, and the PIN is again momentarily in the clear in memory in the application server. Continuing with the example, the PIN is then encrypted inside a token at the application server and the encrypted token containing the PIN is sent via SSL to a banking application server, where the encrypted token containing the PIN is decrypted, at which time the PIN is once more momentarily in the clear in memory. Next, a PIN block is created and encrypted with a session key (KPE-y) of an authentication server using a hardware storage module (HSM) of the banking application server, and the host key-encrypted PIN block is sent to the authentication server, which performs a PIN verification.

While a relatively high level of log-on security is afforded by SSL in transmitting user credentials in such existing art systems, there is presently a concern, for example, among monetary authorities in at least some jurisdictions that there is a risk that an insider might attempt to place 'sniffing' software on a web server or an application server inside a data center and secretly recover the users' credentials, such as the users' PINs or CINs. Further, at least some monetary authorities have imposed requirements on businesses, such as financial institutions, that operate banking websites to encrypt users' credentials, such as PINs and CINs, which are used in logging on to the website in such a way that the users' credentials are never exposed in the clear until they arrive at the authentication server (also referred to herein as the "host server") that validates the user's credentials. Thus, there is a current need for a method and system for encrypting the user's credentials at the user's browser in such a way that they never appear in the clear, either in transmission from the user's browser to the financial institution's system or in any of the intermediate servers or application servers through which the user's credentials pass in the financial institution's system, until they arrive at the authentication server that validates the user's credentials.

SUMMARY OF THE INVENTION

It is a feature and advantage of the present invention to provide a method and system for allowing a user to securely logon on to a host system via an electronic interface, such as an Internet banking interface, that securely encrypts the user's credentials such as the user's PIN or password when entered by a user into a password/PIN field of the Internet interface to the system, such as a banking system, and before it is transmitted to any other server.

It is another feature and advantage of the present invention to provide a method and system for allowing a user to securely logon on to the host system via the electronic interface, in which the algorithm for encrypting the user's credentials, such as a PIN, is not exposed to the user.

It is an additional feature and advantage of the present invention to provide a method and system for allowing a user to securely logon on to the host system via the electronic interface that is configured and initialized in a manner that is secured and in accordance with the security policies of an entity, such as a financial institution.

It is a further feature and advantage of the present invention to provide a method and system for allowing a user to securely logon on to the host system via the electronic interface, which does not significantly adversely affect the performance of the user of the system.

It is a still another feature and advantage of the present invention to provide a method and system for allowing a user to securely logon on to the host system via the electronic interface which is transparent to the user.

It is an additional feature and advantage of the present invention to provide a method and system for allowing a user to securely logon on to the host system via the electronic interface that supports all popular and currently supported browsers.

It is an another feature and advantage of the present invention to provide a mechanism to prevent "sniffing" or capture of user credentials at the user's computing device, e.g., through spyware, browser helper objects or other software that attempts to capture the data stream before SSL encryption.

It is an additional feature and advantage of the present invention to provide a mechanism that prevents the interception and replay of the encrypted user credentials by an unauthorized party.

To achieve the stated and other features, advantages and objects, the method and system for an embodiment of the present invention provides a method and system for allowing a user to securely log on to a host system via an electronic interface, such as an Internet banking interface, which utilizes an applet that is downloaded to the user's browser. The user's credentials, such as a PIN, are encrypted at the user's browser by the applet and sent to an application server provided with a hardware security module, which changes the encryption key and the encryption of the user's credentials, such as the PIN, and returns the encrypted user's credentials, such as the PIN, to the application server. The application server then forwards the encrypted user's credentials, such as the PIN, to the authentication server which decrypts and verifies the user's credentials. Thus, the user's credentials never appear in the clear from the time they are encrypted at the user's browser until they arrive at the actual authentication server that validates the credentials for the user.

More particularly, in an embodiment of the invention, the user at a computing device with a browser is allowed to access the financial institution's website via a web server, and an encryption applet, a replay prevention ID, and a public key of a public/private key pair are sent to the user's browser by the web server. The encryption applet comprises, for example, a faceless applet associated with the financial institution's logon page that is contained in a single class file that contains all functionality required to encrypt the user's credentials and that is able to persist on the user's browser. Further, the private of the public/private key pair is known to a hardware security module (i.e., a tamper-proof encryption module) of the application server.

The user is allowed to enter the user's credentials into the encryption applet, which generates a symmetric key (e.g., a DES key, a triple DES key, an AES key, or any other symmetric key algorithm) based on a random number generated by the encryption applet and encrypts the user's credentials with the symmetric key (e.g., to produce a cipherPIN) and also encrypts the symmetric key (e.g., the DES key, the triple DES key, the AES key, etc.) and replay prevention ID with the public key of the public/private key pair (e.g. to produce a cipherKey). Thereafter the encryption applet clears working variables by the encryption applet to prevent retention of sensitive clear data and the symmetric key-encrypted user's credentials and public key-encrypted symmetric key and replay prevention ID are sent from the user's browser via the web server to the application server.

In an alternative aspect of an embodiment of the invention, the symmetric key-encrypted user's credentials and public key-encrypted symmetric key and replay prevention ID can be sent to the application server from the user's browser via a portal application. In such alternative aspect, the portal application encrypts and digitally signs the symmetric key-encrypted user's credentials and the public key-encrypted symmetric key and replay prevention ID within a single sign-on token and sends the token to the application server, which decrypts the single sign-on token and verifies that the token was received from the portal application as a trusted source.

In either case, upon receipt by the application server, the public key-encrypted symmetric key and replay prevention ID are decrypted with the private key known to the tamper-proof encryption module of the application server, and the symmetric key-encrypted user's credentials are decrypted with the decrypted symmetric key. The decrypted replay prevention ID is compared with a clear-text version of the replay prevention ID retained by the application server, and if the decrypted replay prevention ID and the retained version are identical, the logon is allowed to continue. Thereafter, the decrypted user's credentials are re-encrypted with a new symmetric key known to the authentication server. The decryption and re-encryption are accomplished, for example, by passing the symmetric key-encrypted user's credentials and public key-encrypted symmetric key and replay prevention ID to the tamper-proof encryption module of the application server, which internally within the tamper-proof encryption module, decrypts the public key-encrypted symmetric key and replay prevention ID with the private key of the application server, decrypts the symmetric key-encrypted user's credentials with the decrypted symmetric key, re-encrypts the decrypted user's credentials with the new symmetric key that is known to the authentication server, and returns the decrypted replay prevention ID and re-encrypted user's credentials under the new symmetric key to the application server.

The re-encrypted user's credentials are sent for verification by the application server to the authentication server, which decrypts the re-encrypted user's credentials with the new symmetric key known to the authentication server, checks the decrypted user's credentials for veracity, and if verified, allows the user's logon.

In another aspect of an embodiment of the invention, the user is allowed to access an application server via a web server, and an encryption applet, a replay prevention ID, and a public key of a public/private key pair of an of an authentication server that is co-resident with the application server are downloaded to the user's browser by the application server. The user is allowed to enter the user's credentials into the encryption applet, which encrypts the user's credentials with a symmetric key and encrypts the symmetric key and the replay prevention ID with the public key of the public/private key pair, and the symmetric key-encrypted user's credentials and public key-encrypted symmetric key and the replay prevention ID are sent via the web server to the application server from the user's browser. The symmetric key-encrypted user's credentials and public key-encrypted symmetric key and the replay prevention ID are passed by the application server to the authentication server that is co-resident with the authentication server, and the public key-encrypted symmetric key and the replay prevention ID are decrypted with a private key of the authentication server and the symmetric key-encrypted user's credentials are decrypted with the decrypted symmetric key by an encryption module of the authentication server. The authentication server checks the replay prevention ID and the decrypted user's credentials for veracity, and if verified, allows the user's logon.

In a further aspect of an embodiment of the invention, the user is allowed to access an application server via a web server, which sends an encryption applet, a replay prevention ID, and a public key of a public/private key pair of the application server to the user's browser. The user is allowed to enter the user's credentials into the encryption applet, which encrypts the user's credentials with a symmetric key and encrypts the symmetric key and replay prevention ID with the public key of the public/private key pair. The symmetric key-encrypted user's credentials and the public key-encrypted symmetric key and replay prevention ID are sent via the web server to the application server from the user's browser, and the public key-encrypted symmetric key and the replay prevention ID are decrypted with a private key of the application server and the symmetric key-encrypted user's credentials are decrypted with the decrypted symmetric key. The application server compares the decrypted replay prevention ID with a clear-text version of the replay prevention ID retained by the application server, and if the decrypted replay prevention ID and the retained version are identical, the logon is allowed to continue. The decrypted user's credentials are re-encrypted with a new symmetric key known to an authentication server and sent to the authentication server by the application server for verification. The re-encrypted user's credentials are decrypted with the new symmetric key known to the authentication server, which checks the decrypted user's credentials for veracity, and if verified, allows the user's logon.

Additional objects, advantages and novel features of the invention will be set forth in part in the description which follows, and in part will become more apparent to those skilled in the art upon examination of the following, or may be learned from practice of the invention.

DETAILED DESCRIPTION

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

Referring now in detail to an embodiment of the present invention, examples of which are illustrated in the accompanying drawings, each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

An embodiment of the present invention provides a method and system for allowing a user to securely log on to a host system via an electronic interface, such as an Internet banking interface, in which a user's PIN is encrypted from the moment the user enters his or her PIN at a terminal until it arrives at the host system which authenticates the PIN. Thus, when the user enters his or her PIN into a password/PIN field of an Internet interface to the banking system, the password is securely encrypted before it is transmitted to any other server, and the algorithm for encrypting the PIN is not exposed to the user. The encrypted password is not decrypted by any application in the system until it reaches the host system which authenticates it, or alternatively, if decryption is necessary, the decryption takes place inside a hardware security module ("HSM"), which is essentially a tamper-proof encryption box that performs encryption and also holds keys and which cannot be compromised, for example, by a computer programmer working at the application layer of the architecture.

Figure 1:
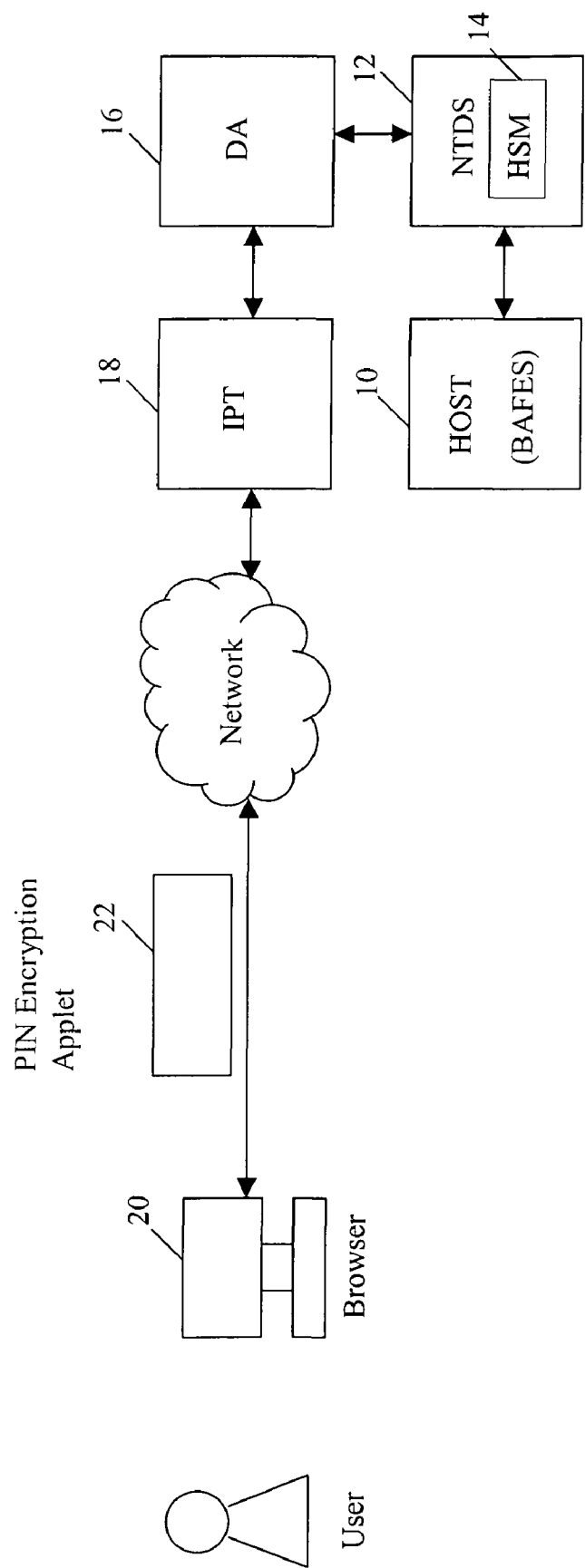
FIG. 1 is a schematic diagram that illustrates an overview example of key components and the flow of information between key components for an embodiment of the invention.

FIG. 1 is a schematic diagram that illustrates an overview example of key components and the flow of information between key components for an embodiment of the invention. Referring to FIG. 1, an embodiment of the invention utilizes, for example, a host system (hereinafter also referred to as "BAFES") 10, an infrastructure layer of the banking application system which supports many applications including banking (hereinafter also referred to as "NTDS") 12, an NTDS hardware security module (hereinafter also referred to as "HSM") 14, an application layer of the banking system (hereinafter also referred to as "DA") 16, an infrastructure layer of a portal application (hereinafter also referred to as "IPT") 18, a Web client browser 20, and a PIN encryption applet 22.

An embodiment of the invention utilizes the PIN encryption applet 22 that is downloaded to the user's browser 20 as part of the user's sign-on process. Inside the PIN encryption applet 22 is code that is able to perform primarily two kinds of encryption algorithms. One of the encryption algorithms is a symmetric key algorithm, such as Data Encryption Standard (DES) encryption, triple DES, Advanced Encryption Standard (AES), etc., and the other encryption algorithm is a public/private key encryption operation. In order to accommodate the existing structure of certain financial institution systems on the backend, in addition to the PIN encryption applet 22, in an embodiment of the invention, the financial institutions host systems actually require or support an application server in encrypting the users' PIN from the application server to the authentication server 10 with a symmetric key that the authentication server 10 exchanges or gives to the application server. Thus, the symmetric key is not passed all the way through to the user's browser 20 for security reasons.

In order to assure that the user's PIN never appears in the clear, according to an embodiment of the invention, the PIN is encrypted by the PIN encryption applet 22 and sent into an application server which is provided with a hardware security module or HSM 14. The application server uses the HSM 14 to take the encrypted PIN from the PIN encryption applet 22, to change its encryption key, and to change the encryption of the PIN inside the HSM 14. The HSM 14 hands the PIN back to the application server 12 in an encrypted form, and the application server 12 forwards the encrypted PIN to the authentication server 10. Thus, the requirement that the user's PIN never appears in the clear is fulfilled in that it is re-encrypted inside the tamper-proof HSM 14, and it is never seen in the clear by any application server software.

The host system or BAFES 10 has access to an actual user authentication system and is the interface between a banking application and the transactions of records. The infrastructure of the banking application system or NTDS 12 which supports, for example, the banking application, is responsible for services, such as communications to the host 10 and interacting with the NTDS HSM 14. Security of the user's PIN between the NTDS 12 and the BAFES 10 is based on symmetric key encryption of the PIN. The NTDS HSM 14 performs a PIN block translation on the symmetric key-encrypted PIN block generated by the PIN encryption applet 22. An example of a hardware storage module HSM suitable for an embodiment of the invention utilizes a cryptographic device, such as an IBM4758 Crypto Card, and the setup of the HSM 14 includes creation of a PKI key pair. The public key is included in an HTML page that downloads the PIN encryption applet 22 to the Web client browser 20, and the private key is retained in the HSM 14. The HSM 14 receives, for example, a DES cipherKey and a cipherPIN block, the cipherKey is decrypted with the private key of the HSM 14, and the resulting DES key is temporarily kept in the HSM 14. The cipherPIN block is then translated from the temporary DES key to the DES key used by the BAFES DES, also contained in the HSM 14.

Using a "welcome mat" component of DA 16, the login message is received by DA 16 either from native mode or the infrastructure layer of the portal application or IPT 18, and DA 16 puts together a request to the host 10 using the various services of NTDS 12. In an embodiment of the invention, DA 16 is the front end to international personal banking (also referred to herein as "IPB") customer authentication. The IPT 18 allows a financial institution, for example, to aggregate several Web services and provides a platform for customer acquisition and cross selling of the financial products managed by the financial institution. In an embodiment of the invention, the IPT 18 is the layer that presents the login, for example, for all customers except for IPB customers. With regard to the Web client browser 20, an embodiment of the invention supports various browsers, such as Internet Explorer and Netscape, as well as browsers on Macintosh.

The PIN encryption applet 22 is responsible for securing the user's PIN before it is sent to the Web server. The PIN encryption applet 22 is a faceless applet associated with the financial institution's login page and is downloaded to and executes on the Web client browser 20. The PIN encryption applet 22 is contained in a single class file that contains all the required functionality. The applet size is sufficiently small to avoid a need to sign it, which would allow it to retained on the client machine 20. The PIN encryption applet 22 uses, for example, both symmetric-key encryption and RSA public-key encryption to protect the PIN and the symmetric key respectively. The PIN encryption applet 22 is called, for example, from JavaScript in the login page with the user's clear PIN and returns an encrypted PIN (cipherPINblock) and an encrypted symmetric session key (cipherKey). Functionally, the PIN encryption applet 22 creates a symmetric key based on a high quality random number generated by the PIN encryption applet 22, checks the PIN composition and length (the length check defaults to the technical limits of a PIN/Pad PIN block, but may optionally be adjusted to more restrictive limits), encrypts the clear PIN to produce a cipherPIN, encrypts the symmetric key to produce a cipherKey, returns the cipherPIN and cipherKey, and clears the working variables appropriately to prevent retention of sensitive clear data.

An embodiment of the invention employs various data elements including, for example, an HSM public key, an HSM private key, the clear PIN, an encrypted PIN block, an encrypted symmetric key, a financial institution identification number ("CIN"), a hidden field information, a CIN field, a PIN field, and key generation data. The HSM public key is the public key of the PKI key pair of the NTDS HSM 14 that is used by the PIN encryption applet 22 to encrypt the symmetric key that is in turn used to encrypt the user's PIN. The HSM private key is the private key of the PKI key pair of the NTDS HSM 14 that is contained, for example, in the cryptographic device, such as the IBM4758 Crypto Card, and used to unwrap the symmetric key used by the PIN encryption applet 22 to encrypt the user's PIN.

The symmetric key is the key, such as a DES key, triple DES key, AES key, or the like, used by the applet 22 and the encryption-manager in NTDS 12 in order to protect the PIN in accordance with the financial institution's security standards. The symmetric key is created by the applet 22 and encrypted with the public key, passed in a single sign-on token (also referred to herein as "eAce token") back to the DA server 16, and thereafter the private key is used to decrypt the symmetric key within the cryptographic device 14, such as the IBM4758 Crypto Card. Finally, the symmetric key is used by the NTDS component 14 to decrypt the CIN at the hardware layer, in the cryptographic device 14, such as the IBM4758 Crypto Card, and encrypt the CIN using the authentication server's symmetric key before the new PIN block is passed to the authentication server 10.

The clear PIN is the PIN that is entered into an HTML control and processed once the user selects a submit button. At that time, the clear PIN is destroyed at the Web browser 20 and is never seen at the application layer of the architecture again until the BAFES host 10 processes it. The encrypted PIN block is a symmetric key-encrypted PIN/PAD PIN block or PIN block cipher PIN that is, for example, a 16-character encrypted PIN. The encrypted PIN block has two incarnations. First, the applet 22 encrypts the PIN using a symmetric key generated by the applet 22. Thereafter, the cryptographic device 14, such as the IBM4758 Crypto Card, decrypts the encrypted PIN with the symmetric key generated by the applet 22 and re-encrypts the PIN using a host key that it receives when the NTDS server 12 initializes its connections to the host 10. Through all of this, neither the symmetric key nor the actual PIN is exposed in memory.

The encrypted symmetric key is shared by the applet 22 and NTDS 12 and does the actual work of encrypting and decrypting the PIN. The symmetric key is encrypted with the public key in the applet 22, and then packaged and passed through to the DA server 16 along with the encrypted PIN block. The DA server 16/NTDS 12 uses the private key of the cryptographic device 14, such as the IBM4758 Crypto Card, to import the symmetric key and uses this symmetric key to translate the encrypted PIN Block into the host-expected PIN Block using the host key and a translate command. The host-expected PIN Block is then sent to the host 10 via a "BackDoorManager" component of the NTDS 12 for verification. Through all of this, neither the symmetric key nor the real PIN is exposed in memory.

The CIN is a financial institution identification number which uniquely identifies a customer across a financial institution business. The hidden field information is a hidden field on the HTML form that is submitted. This field contains the cipherPin and the symmetric cipherkey to be used by NTDS 12 and DA 16. The name of the particular field is "Information". The CIN field is passed from the Web browser 20 to the IPT system 18 in a field named "Login". The PIN field is an input field of type "Password" for user input. As soon as the user selects the submit button, and after the value of the "Information" field is populated, the value is replaced by garbage, e.g., 'XXXxXXX'. The key generation data is the data necessary to generate a public and private key using the hardware layer of NTDS 12. This data must be identical for each business. Therefore NTDS 12 provides a service to extract this data as a file and use on the various DA servers 16.

FIGS. 2(*a*) and 2(*b*) show a flow chart that illustrates an example of the end-to-end encryption process for an embodiment of the invention. Referring to FIGS. 2(*a*) and 2(*b*), at S1, a user visits the financial institution's website and goes to a logon page served up, for example, by an infrastructure layer of a portal application that allows the financial institution to aggregate several web services, which is proprietary to the financial institution (also referred to herein in as "the IPT system" or "IPT") 18. At S2, the IPT system 18 returns a log-on page along with an applet tag that references the PIN encryption applet 22 of the present invention. In addition to the reference to the applet 22, the applet tag also includes a single parameter, which is the public key of the on-line banking system server 12 that re-encrypts the user's PIN using the HSM 14 before sending it on to the authentication server 10. At S3, the applet 22 and a replay prevention ID are downloaded to the user's browser 20 and the applet 22 is implemented in such a way that it is small enough that it does not have to be signed. The implication of that is that it is only necessary to download the applet 22 to the user's browser 20 on one occasion, after which the applet 22 can persist on the user's browser 20 in most cases and does not have to be downloaded each time the user logs on.

Figure 2A:
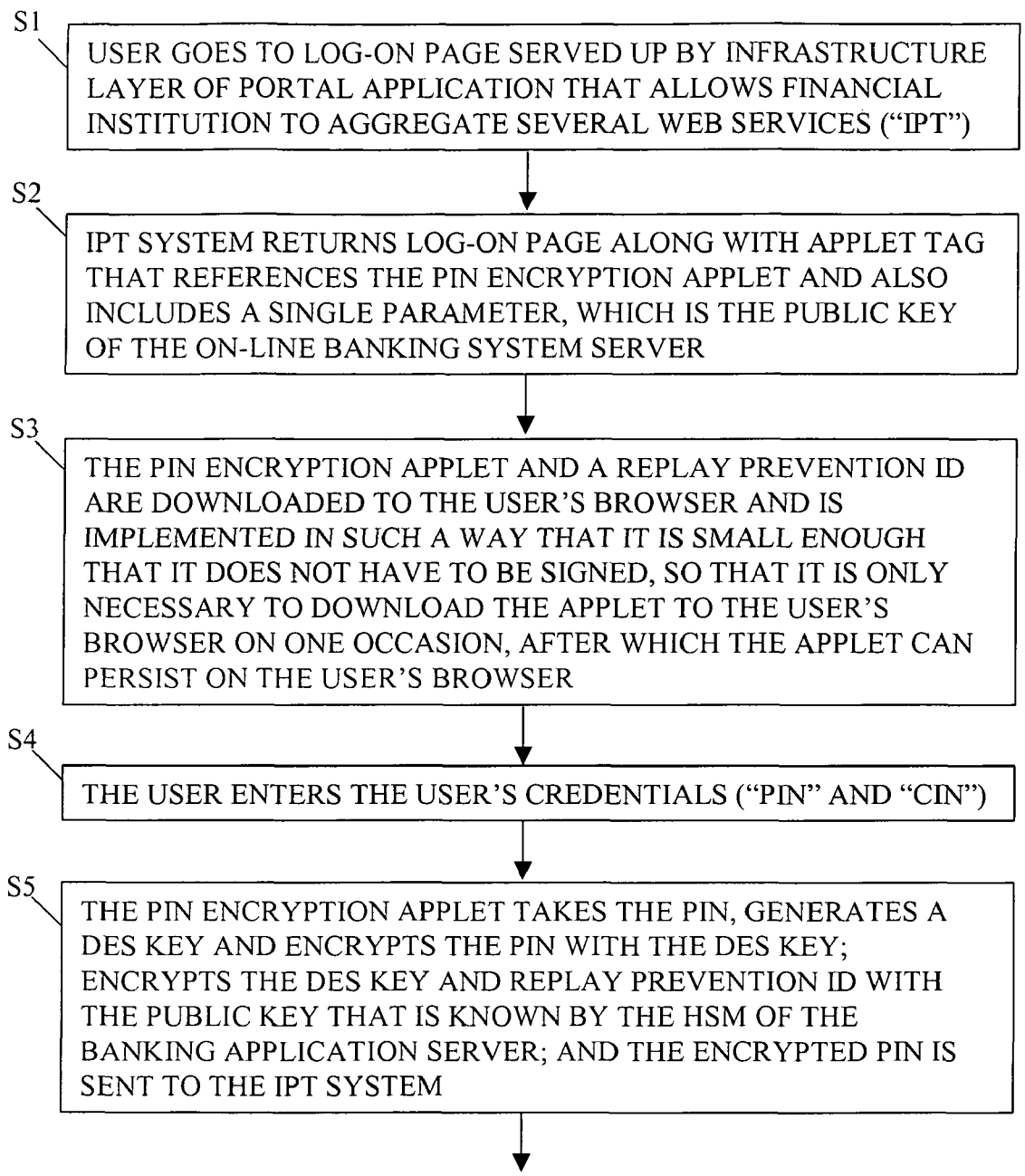
FIGS. 2(a) and 2(b) show a flow chart that illustrates an example of the end-to-end encryption process for an embodiment of the invention.
Figure 2B:
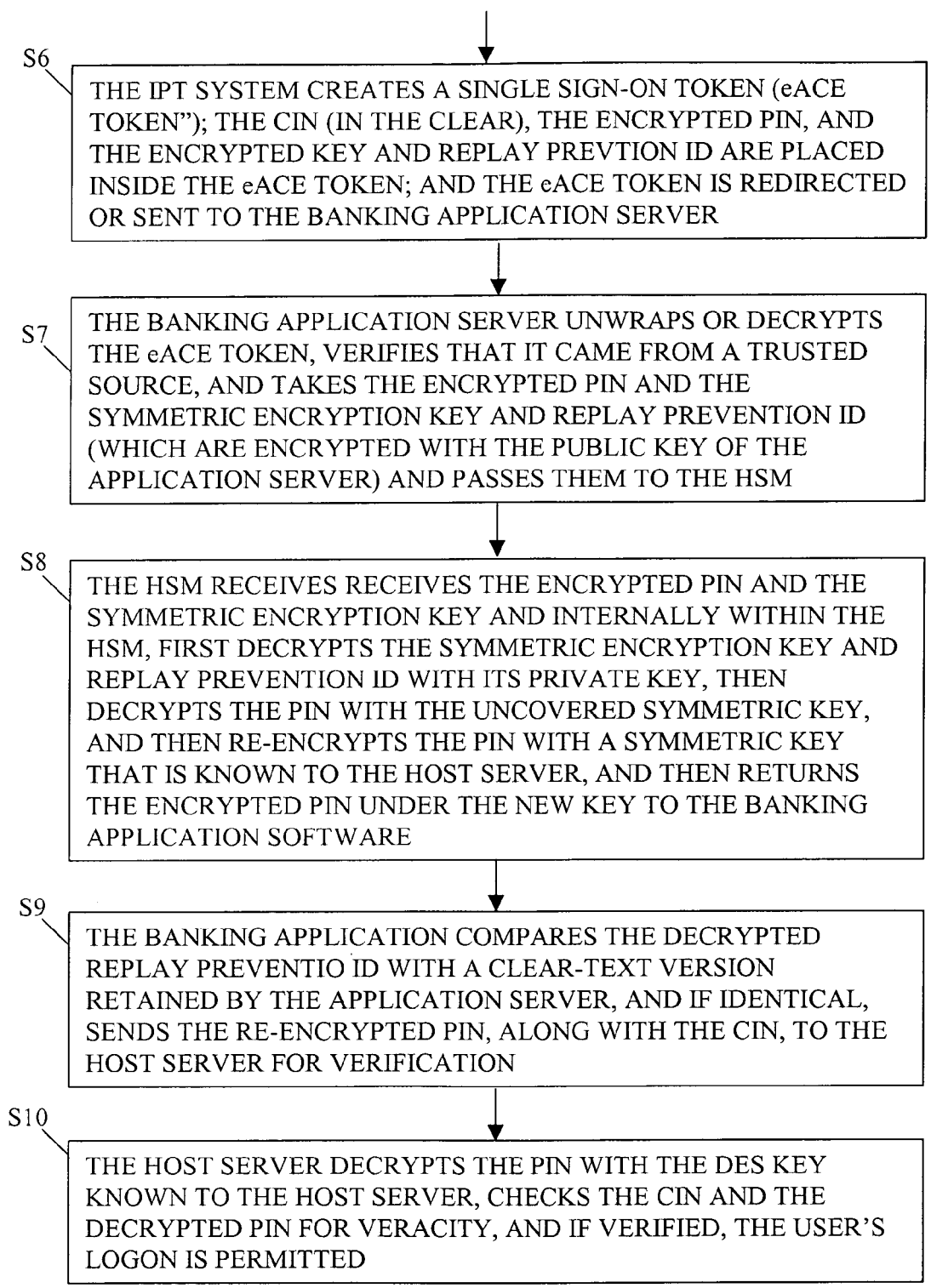

Referring further to FIGS. 2(a) and 2(b), at S4, the user enters the user's credentials, such as the user's PIN and the user's CIN. At S5, the applet 22 takes the PIN, generates a symmetric key, and encrypts the PIN with the symmetric key. Thereafter, the applet 22 encrypts the symmetric key and replay prevention ID with the public key that is known by the encryption box or HSM 14 of the banking application server 12, and the encrypted PIN is sent to the IPT system 18. At this point, the IPT system 18 has the user's CIN in the clear and the user's PIN, which is symmetric key-encrypted, and the key for the particular symmetric encryption and replay prevention ID, which are in turn encrypted with the public key of the banking application server 12. At S6, the IPT system 18 then creates a single sign-on token (also referred to herein as the eACE token) according to the single sign-on mechanism described in co-pending U.S. patent application Ser. No. 09/668,112 entitled METHOD AND SYSTEM FOR SINGLE SIGN-ON USER ACCESS TO MULTIPLE WEB SERVERS, the disclosure of which is incorporated herein by this reference. The CIN, the encrypted PIN, and the encrypted key and replay prevention ID are placed inside the eACE token, and the eACE token is redirected or sent to the banking application server 12. At S7, the banking application server 12 unwraps or decrypts the eACE token, verifies that it came from a trusted source, and takes the encrypted PIN and replay prevention ID and passes it to the HSM 14, which internally decrypts the encrypted PIN.

In other words, the banking application server 12 actually takes the encrypted PIN and the symmetric encryption key (which itself is encrypted with the public key of the application server 12) and replay prevention ID and passes them to the HSM 14, which, at S8, internally within the HSM 14, first decrypts the symmetric encryption key and replay prevention ID with its private key, then decrypts the PIN with the uncovered symmetric key, and then re-encrypts the PIN with a symmetric key that is known to the authentication server 10. The HSM 14 then returns the encrypted PIN under the new key to the banking application software 12, which, at S9, compares the decrypted replay prevention ID with a clear-text version of the replay prevention ID retained by the application server, and if the decrypted replay prevention ID and the retained version are identical, sends the re-encrypted PIN, along with the CIN, to the authentication server 10 for verification. At S10, the authentication server 10 decrypts the PIN with the symmetric key known to the authentication server 10, checks the CIN and the decrypted PIN for veracity, and if verified, the user's logon is permitted.

Figure 3:
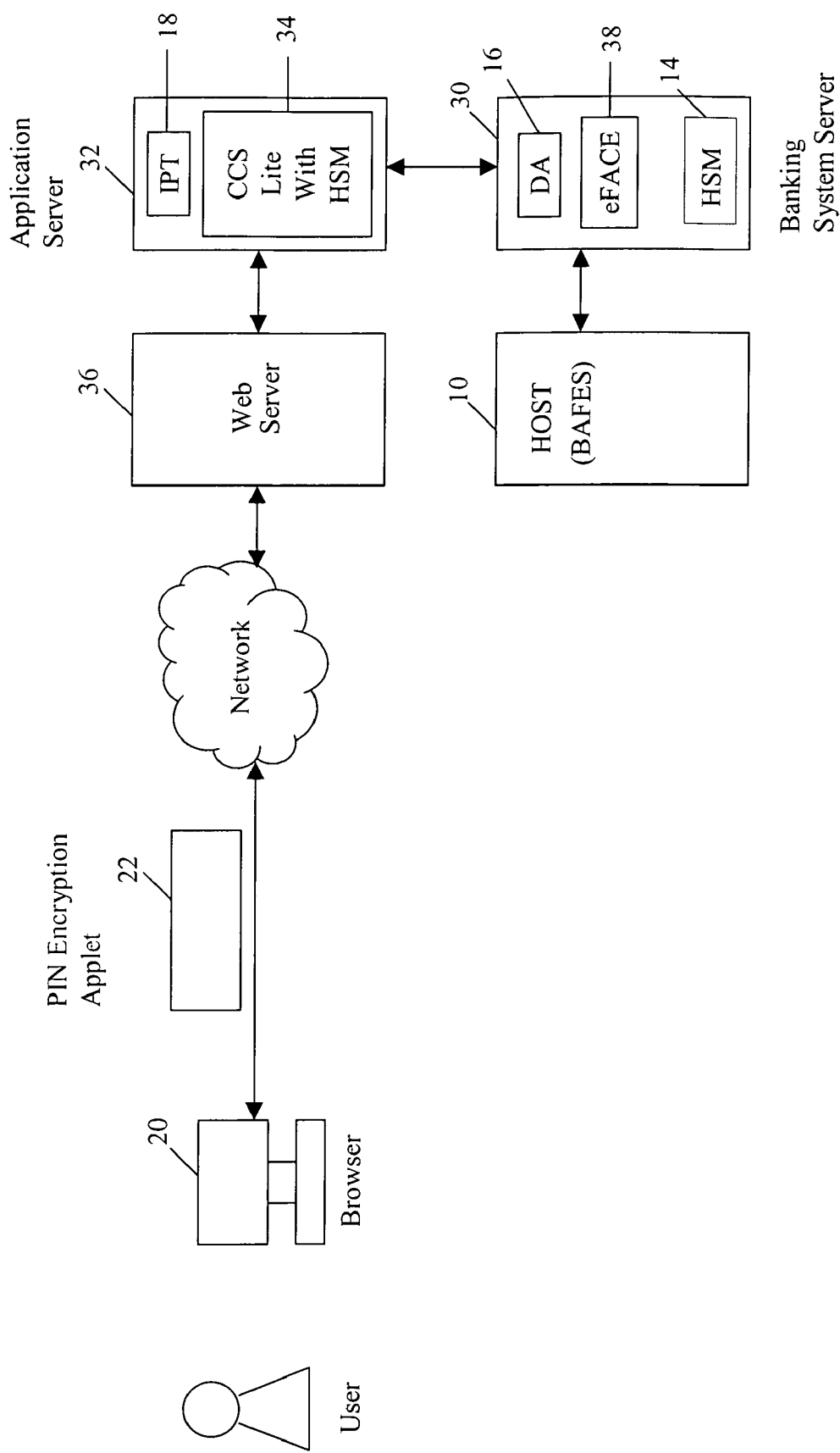
FIG. 3 is a schematic diagram that provides an example of additional details of key components and the flow of information between key components for an embodiment of the invention.

FIG. 3 is a schematic diagram that provides additional details of an example of key components and the flow of information between key components for an embodiment of the invention. Referring to FIG. 3, in addition to the host 10, the DA 16, the DA HSM 14, the IPT 18, the user's browser 20, and the PIN encryption applet 22, an embodiment of the invention utilizes, for example, a banking system server 30, an application server 32, a proprietary authentication mechanism referred to as "Combined Credential Store-Lite" (hereinafter "CCS-lite") 34, and a web server 36.

Figure 4A:
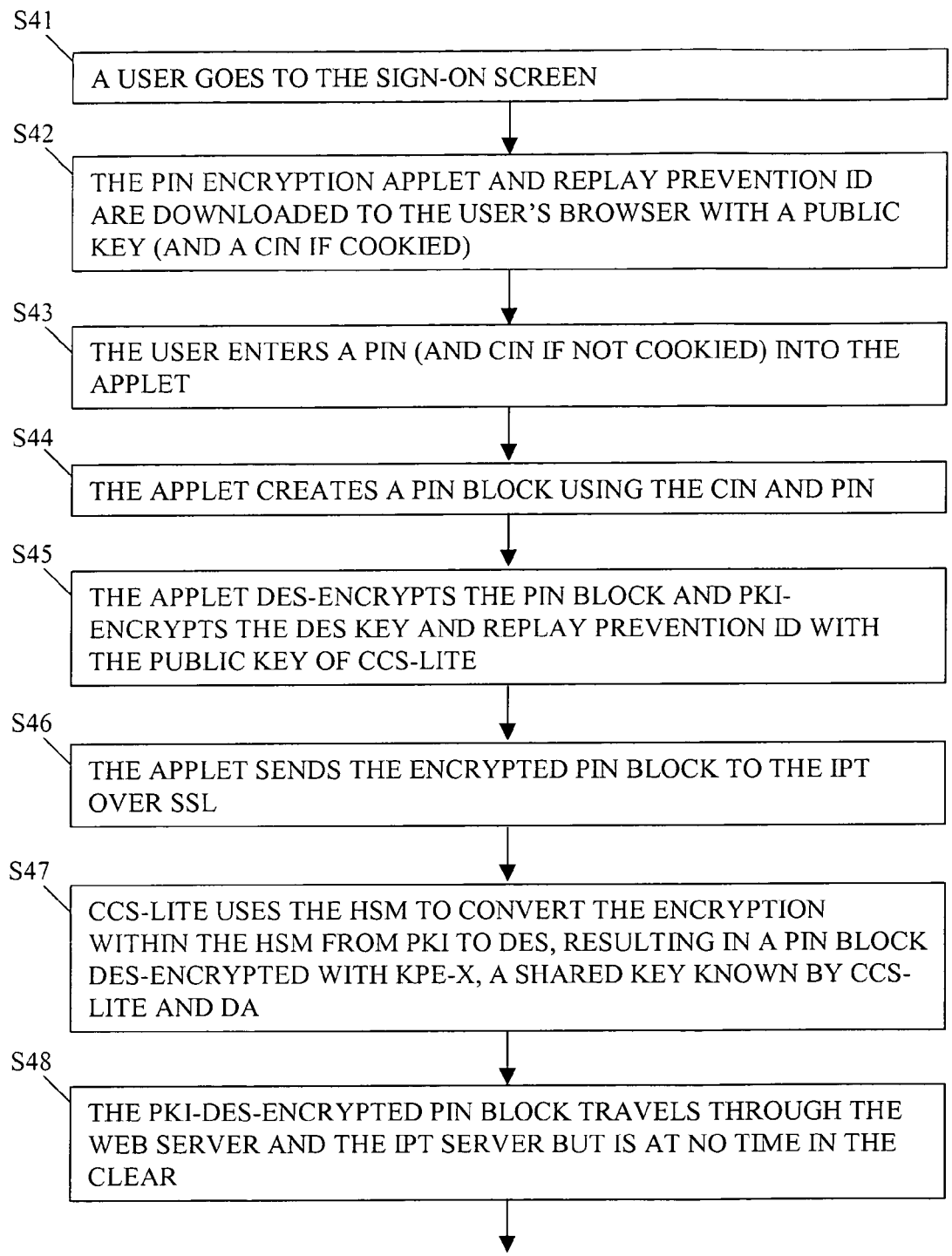
FIGS. 4(a) and 4(b) show a flow diagram that illustrates an example of the PIN flow process for a normal login for an embodiment of the invention.
Figure 4B:
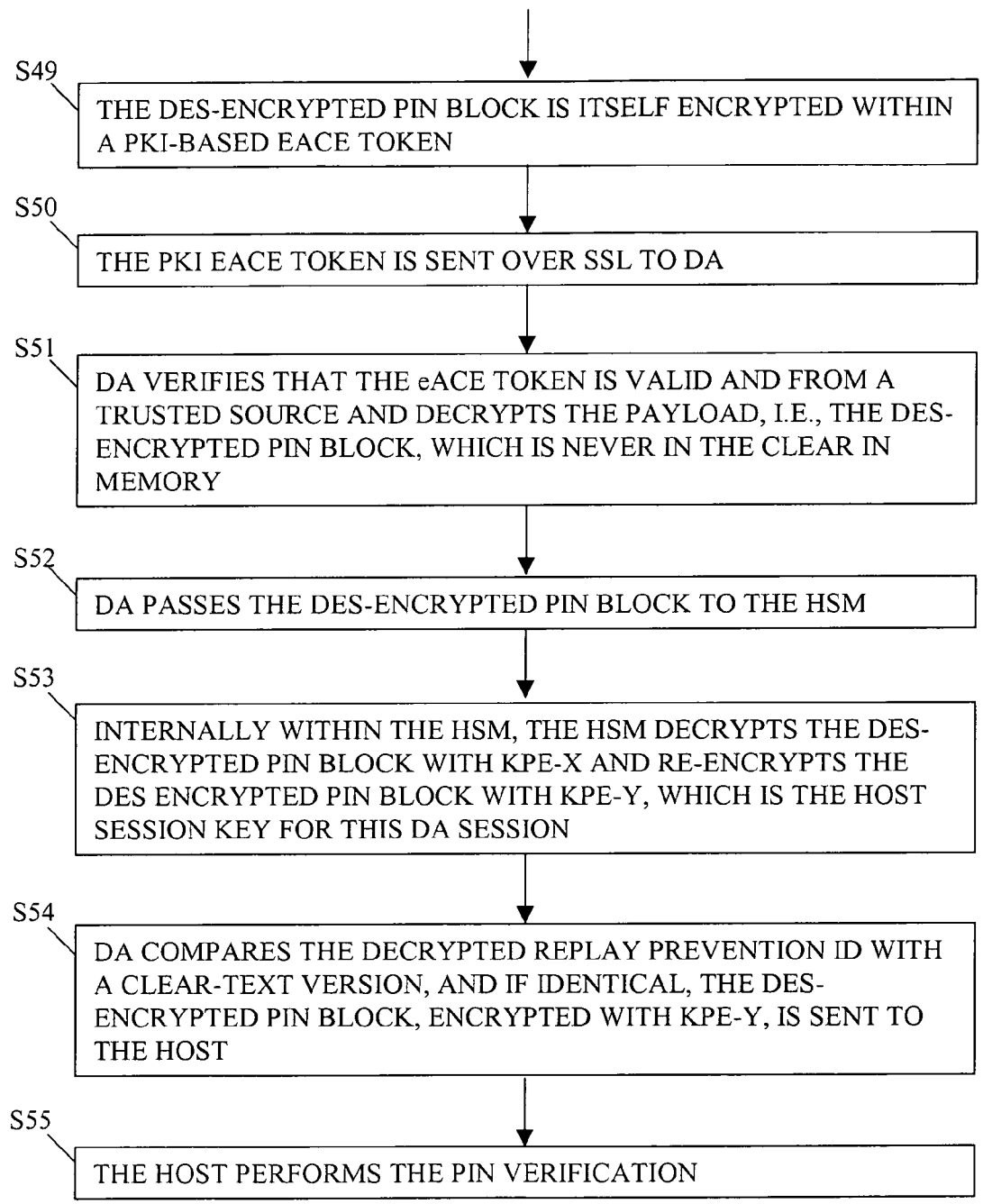

FIGS. 4(a) and 4(b) show a flow diagram that illustrates an example of the PIN flow process for a normal login for an embodiment of the invention. Referring to FIGS. 4(a) and 4(b), at S41, a user goes to a sign-on screen; at S42, the PIN encryption applet 22 and replay prevention ID are downloaded to the browser 20 with a public key (and a CIN, if cookied); at S43, the user enters a PIN (and CIN, if not cookied) into the applet 22; at S44, the applet 22 creates a PIN block using the CIN and PIN; at S45, the applet 22 symmetric key-encrypts the PIN block and PKI encrypts the symmetric key and replay prevention ID with the public key of CCS-lite 34; and at S46, the applet 22 sends the encrypted PIN block to the IPT 18 over SSL. At S47, the PKI-symmetric key-encrypted PIN block travels through the Web server 36 and the IPT server 18, but is at no time in the clear.

Referring further to FIGS. 4(a) and 4(b), at S48, CCS-lite 34 uses the HSM 14 to convert encryption within the HSM 14 from PKI to symmetric key encryption resulting in a PIN block symmetric key-encrypted with KPE-x, a shared key known by CCS-lite 43 and DA 16; at S49, the symmetric key-encrypted PIN block is encrypted within a PKI-based eACE token 38; and at S50, the PKI eACE token 38 is sent over SSL to DA 16. At S51, DA 16 verifies that the eACE token 38 is valid and from a trusted source and decrypts the payload, i.e., the symmetric key-encrypted PIN block, which is never in the clear in memory; at S52, DA 16 passes the symmetric-encrypted PIN block to the HSM 14; at S53, internally within the HSM 14, the HSM 14 decrypts the symmetric key-encrypted PIN block with KPE-x, re-encrypts the symmetric key encrypted PIN block with KPE-y, which is the host 10 session key for this DA session; at S54, the DA 16 compares the decrypted replay prevention ID with a clear-text version of the replay prevention ID, and if the decrypted replay prevention ID and the retained version are identical, the symmetric key-encrypted PIN block, encrypted with KPE-y, is sent to the host 10; and at S55, the authentication server 10 performs the PIN verification.

Figure 5A:
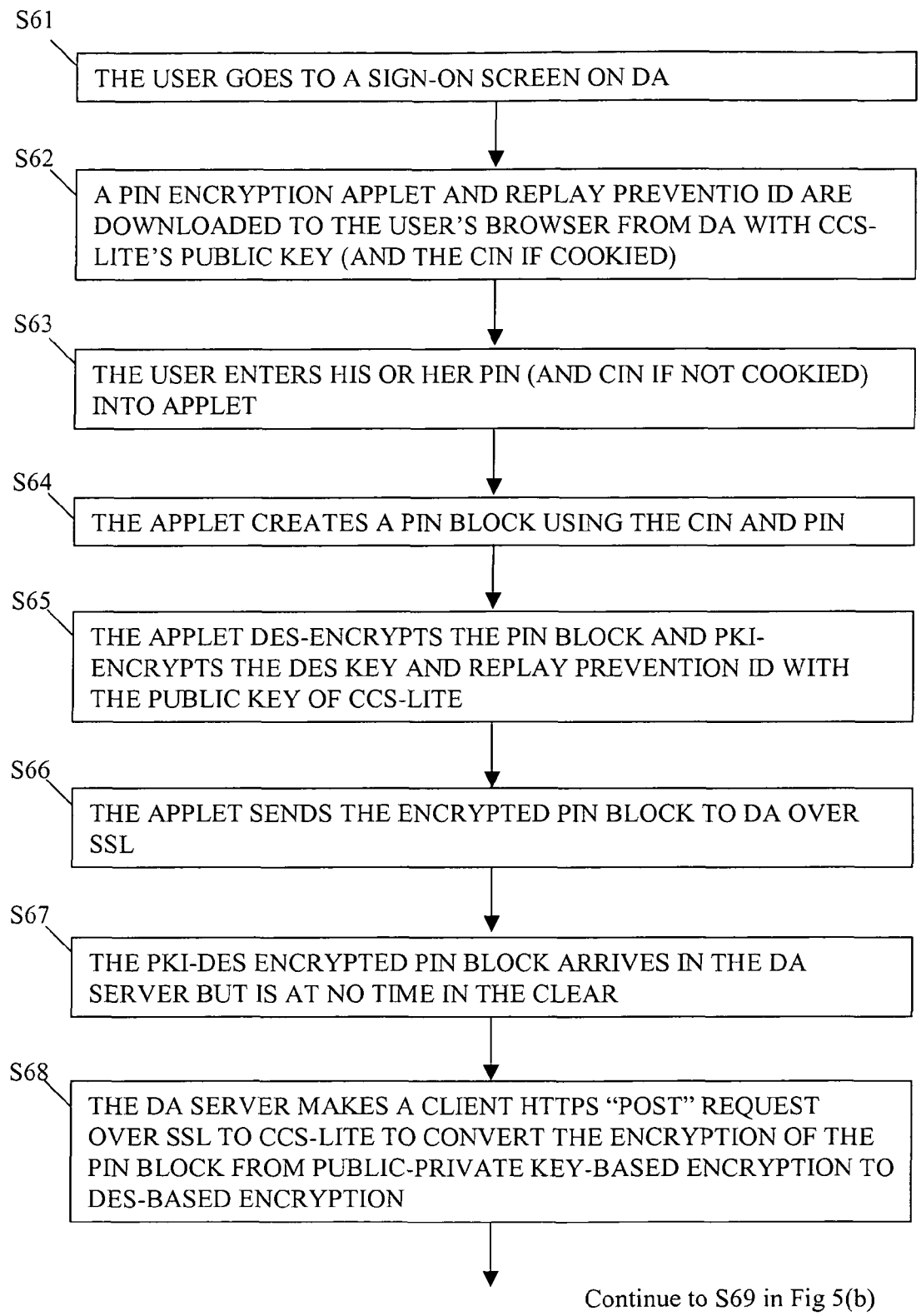
FIGS. 5(a) and 5(b) show a flow diagram that illustrates an example of PIN flow in connection with re-entry of a PIN or native login directly to DA for an embodiment of the invention.
Figure 5B:
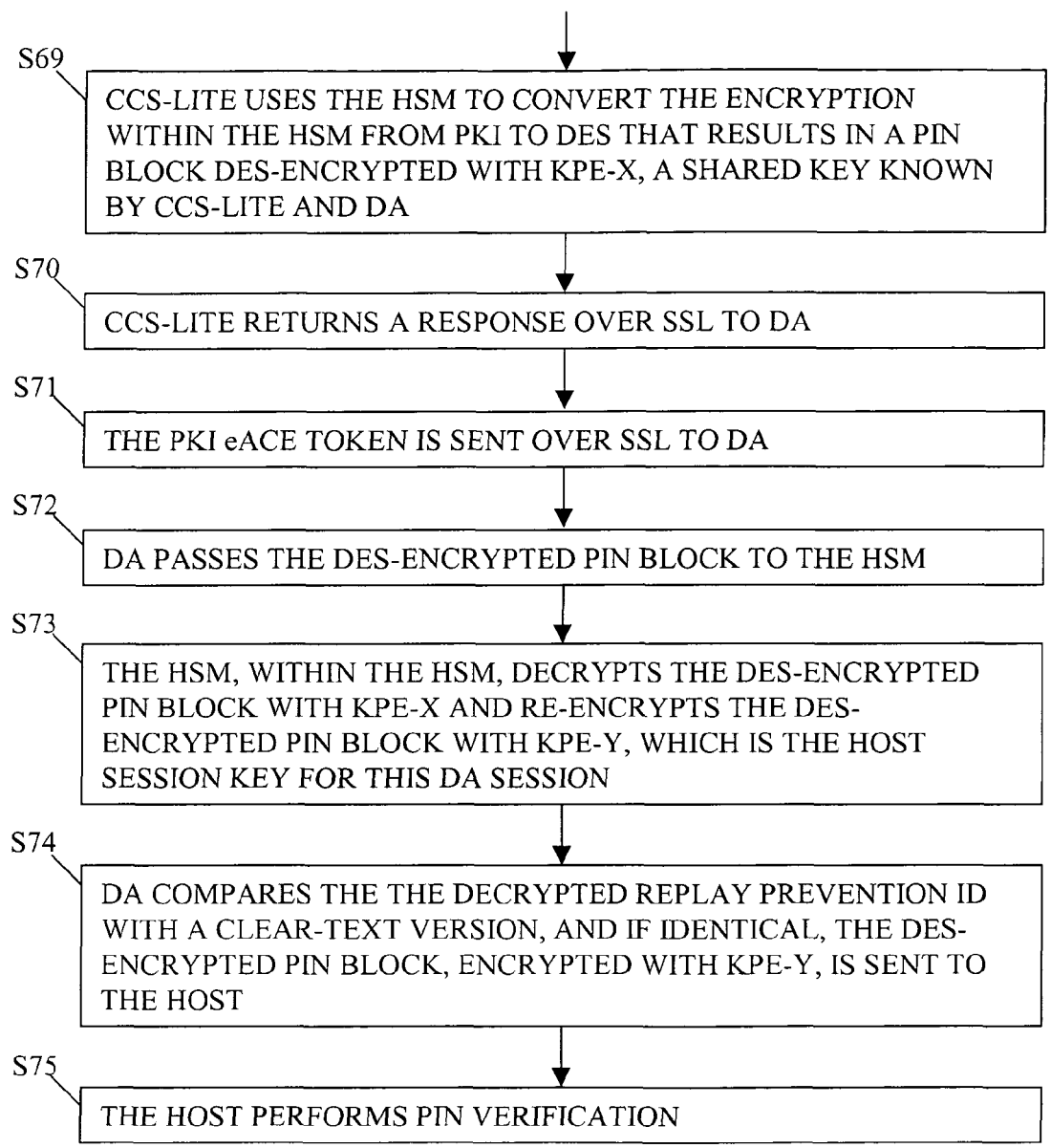

There are situations within a session when it is necessary for DA 16 to ask the user to re-enter the user's PIN, and there are likewise situations in which certain users are required to login directly to DA 16 and bypass the portal 18. FIGS. 5(a) and 5(b) show a flow diagram that illustrates an example of PIN flow in connection with re-entry of a PIN or native login directly to DA 16 for an embodiment of the invention. Referring to FIGS. 5(a) and 5(b), at S61, the user goes to a sign-on screen on DA 16; at S62, a PIN encryption applet 22 and replay prevention ID are downloaded to the browser 20 from DA 16 with CCS-lite's public key (and the CIN if cookied); and at S63, the user enters his or her PIN (and CIN if not cookied) into applet 22. At S64, the applet 22 creates a PIN block using the CIN and PIN; at S65, the applet 22 symmetric key-encrypts the PIN block and PKI-encrypts the symmetric key and replay prevention ID with the public key of CCS-lite 34; and at S66, the applet 22 sends the encrypted PIN block to DA 16 over SSL.

Referring further to FIGS. 5(a) and 5(b), at S67, the PKI-symmetric key encrypted PIN block arrives in the DA server 16 but is at no time in the clear. At S68, the DA server 16 makes a client HTTPS "Post" request over SSL to CCS-lite 34 to convert the encryption of the PIN block from public-private key-based encryption to symmetric key-based encryption; at S69, CCS-lite 34 uses the HSM 14 to convert the encryption within the HSM 14 from PKI to symmetric key encryption that results in a PIN block symmetric key-encrypted with KPE-x, a shared key known by CCS-lite 34 and DA 16; and at S70, CCS-lite 34 returns a response over SSL to DA 16. At S71, the PKI eACE token 38 is sent over SSL to DA 16; at S72, the DA 16 passes the symmetric key-encrypted PIN block to the HSM 14; and at S73, the HSM 14, within the HSM 14, decrypts the symmetric key-encrypted PIN block with KPE-x and re-encrypts the symmetric key-encrypted PIN block with KPE-y, which is the authentication server 10 session key for this DA 16 session. at S74, the DA 16 compares the decrypted replay prevention ID with a clear-text version of the replay prevention ID, and if the decrypted replay prevention ID and the retained version are identical, the symmetric key-encrypted PIN block, encrypted with KPE-y, is sent to the authentication server 10; and at S75, the authentication server 10 performs PIN verification.

Figure 6:
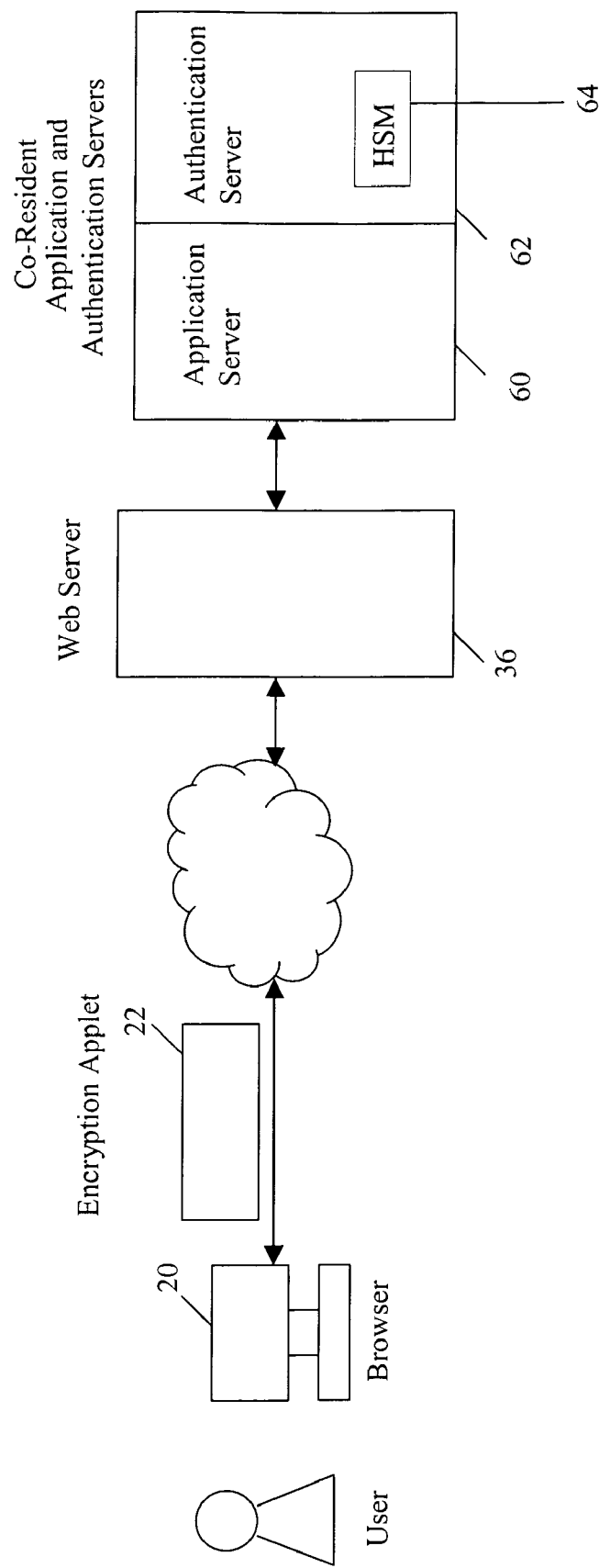
FIG. 6 is a schematic diagram that illustrates an overview example of key components and the flow of information between key components for an alternate aspect of an embodiment of the invention.
Figure 7:
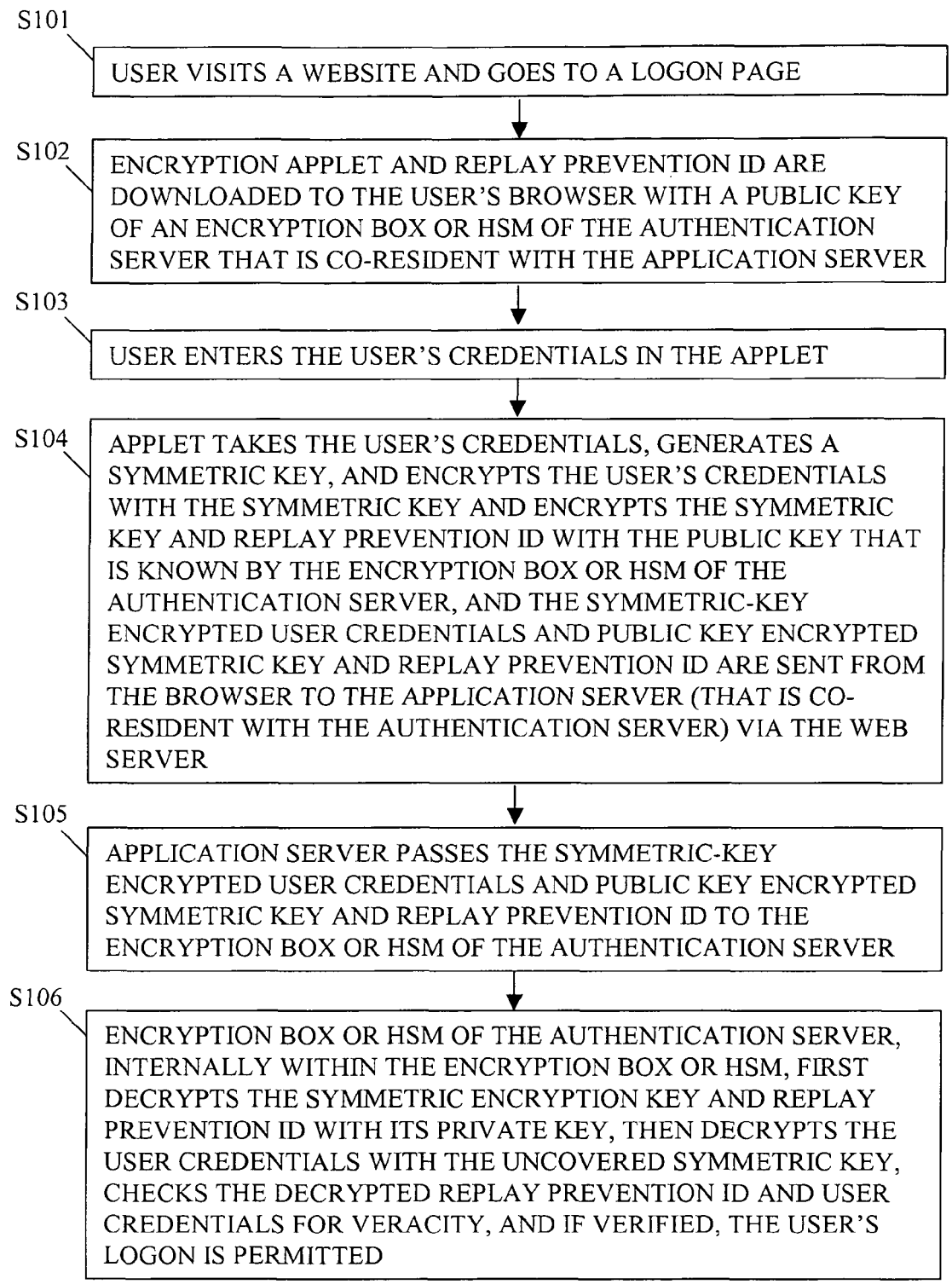
FIG. 7 is a flow chart that illustrates an example of the end-to-end encryption process for the alternate aspect of an embodiment of the invention according to FIG. 6.

FIG. 6 is a schematic diagram that illustrates an overview example of key components and the flow of information between key components for an alternate aspect of an embodiment of the invention. FIG. 7 is a flow chart that illustrates an example of the end-to-end encryption process for the alternate aspect of an embodiment of the invention according to FIG. 6. Referring to FIGS. 6 and 7, at S101, a user visits a website and goes to a logon page, and at S102, the encryption applet 22 and a replay prevention ID are downloaded to the user's browser 20 with a public key of an encryption box or HSM 64 of the authentication server 62 that is co-resident with the application server 60. At S103, the user enters the user's credentials in the applet, and at S104, the applet 22 takes the user's credentials, generates a symmetric key, and encrypts the user's credentials with the symmetric key and encrypts the symmetric key and replay prevention ID with the public key that is known by the encryption box or HSM 64 of the authentication server 62, and the symmetric-key encrypted user credentials and public key encrypted symmetric key and replay prevention ID are sent from the browser to the application server 60 (that is co-resident with the authentication server 62) via the web server 36. At S104, the application server 60 passes the symmetric-key encrypted user credentials and public key encrypted symmetric key and replay prevention ID to the encryption box or HSM 64 of the authentication server 62, which, at S105, internally within the encryption box or HSM 64 of the authentication server 62, first decrypts the symmetric encryption key and replay prevention ID with its private key, then decrypts the user credentials with the uncovered symmetric key, checks the decrypted and replay prevention ID user credentials for veracity, and if verified, the user's logon is permitted.

Figure 8:
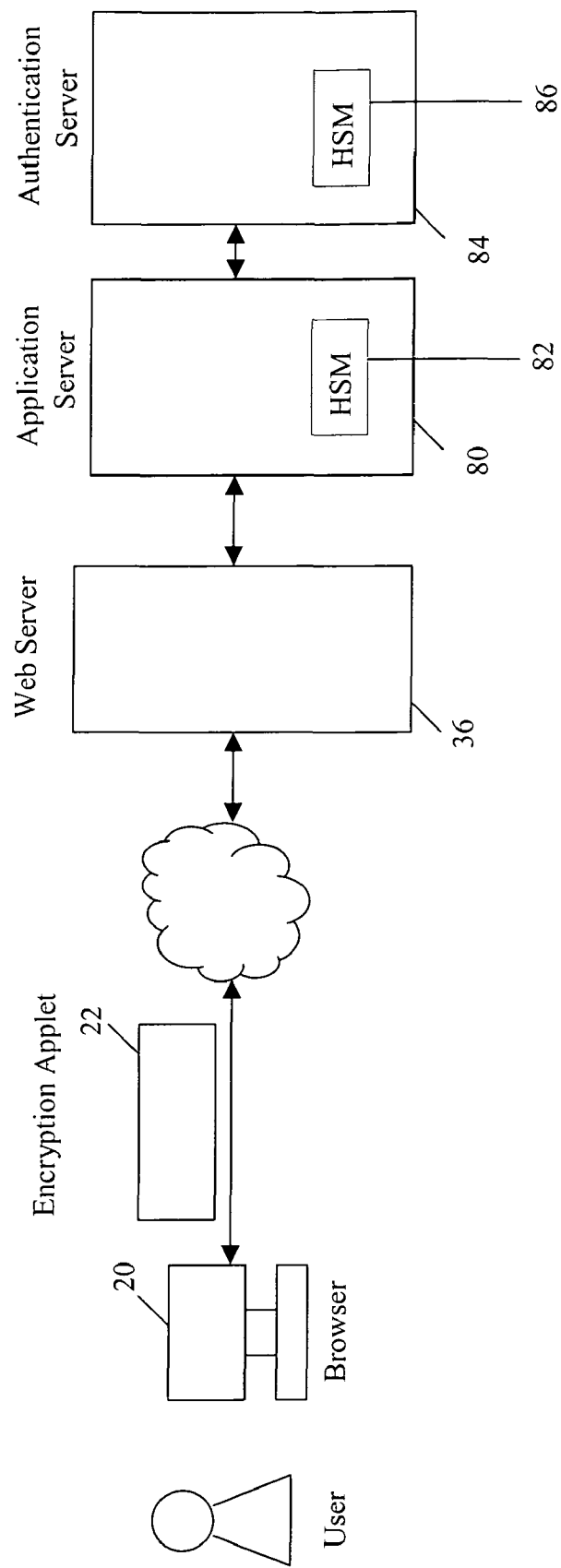
FIG. 8 is a schematic diagram that illustrates an overview example of key components and the flow of information between key components for another alternate aspect of an embodiment of the invention.
Figure 9A:
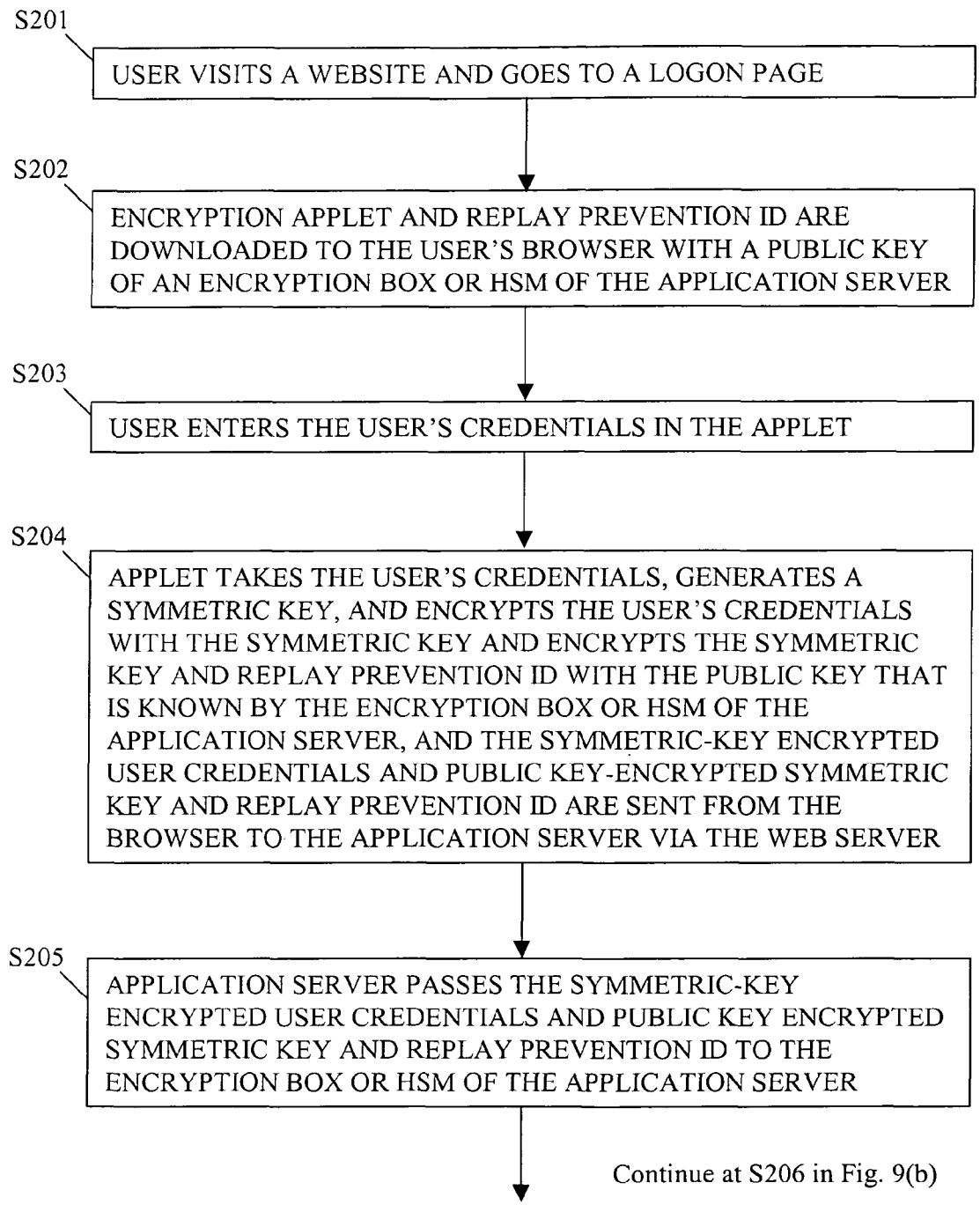
FIGS. 9(a) and 9(b) show a flow chart that illustrates an example of the end-to-end encryption process for the alternate aspect of an embodiment of the invention according to FIG. 8.
Figure 9B:
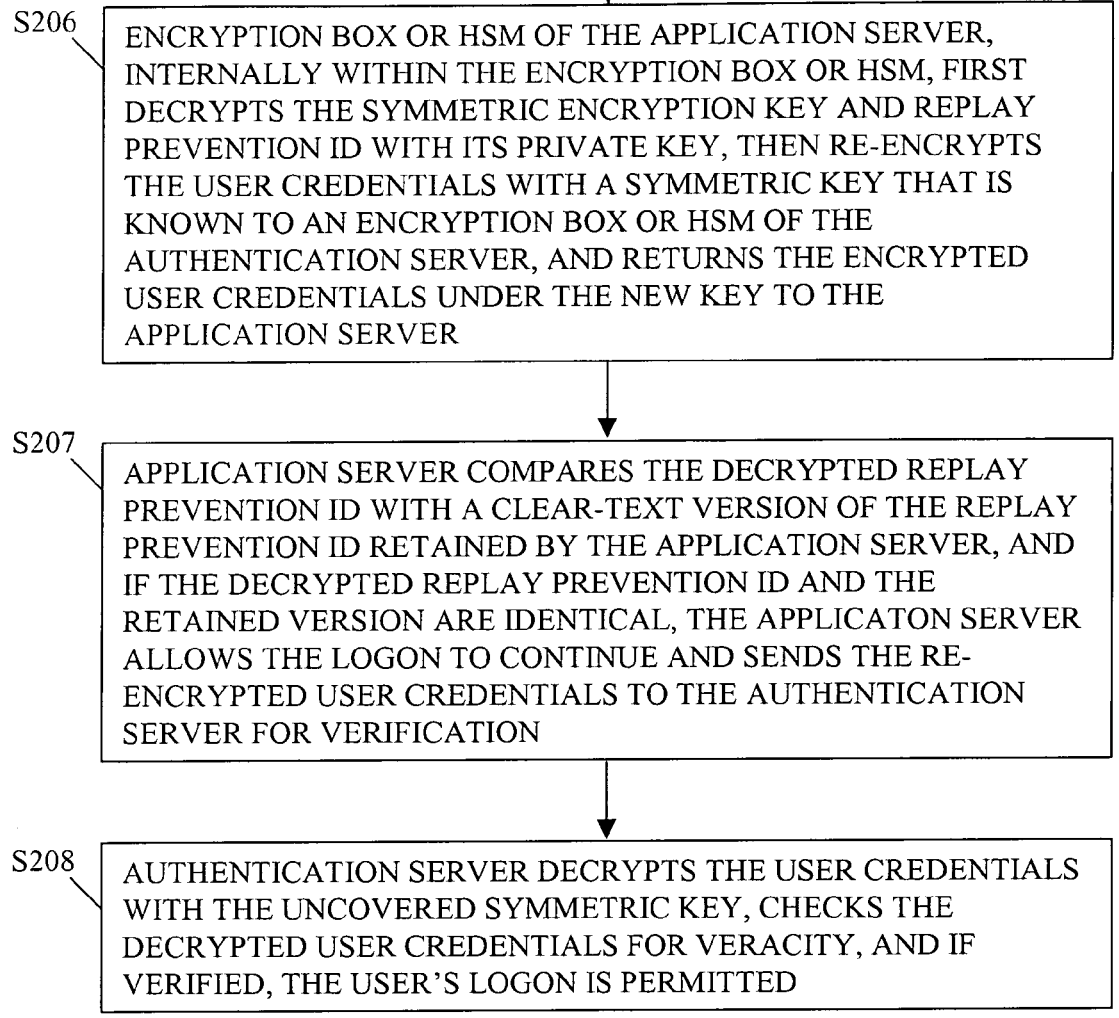

FIG. 8 is a schematic diagram that illustrates an overview example of key components and the flow of information between key components for another alternate aspect of an embodiment of the invention. FIGS. 9(*a*) and 9(*b*) show a flow chart that illustrates an example of the end-to-end encryption process for the alternate aspect of an embodiment of the invention according to FIG. 8. Referring to FIGS. 8, 9(*a*) and 9(*b*), at S201, a user visits a website and goes to a logon page, and at S202, the encryption applet 22 and replay prevention ID are downloaded to the user's browser 20 with a public key of an encryption box or HSM 82 of the application server 80. At S203, the user enters the user's credentials in the applet, and at S204, the applet 22 takes the user's credentials, generates a symmetric key, and encrypts the user's credentials with the symmetric key and encrypts the symmetric key and replay prevention ID with the public key that is known by the encryption box or HSM 82 of the application server 80, and the symmetric-key encrypted user credentials and public key-encrypted symmetric key and replay prevention ID are sent from the browser to the application server 80 via the web server 36. At S205, the application server passes the symmetric-key encrypted user credentials and public key encrypted symmetric key and replay prevention ID to the encryption box or HSM 82 of the application server 80, which, at S206, internally within the encryption box or HSM 82, first decrypts the symmetric encryption key and replay prevention ID with its private key, then decrypts the user credentials with the uncovered symmetric key, and then re-encrypts the user credentials with a symmetric key that is known to an encryption box or HSM 86 of the authentication server 84. The encryption box or HSM 82 of the application server 80 then returns the encrypted user credentials under the new key to the application server 80, which, at S207, compares the decrypted replay prevention ID with a clear-text version of the replay prevention ID retained by the application server 80, and if the decrypted replay prevention ID and the retained version are identical, the application server 80 allows the logon to continue and sends the re-encrypted user credentials to the authentication server 84 for verification. At S208, the authentication server 84 decrypts the user credentials with the uncovered symmetric key, checks the decrypted user credentials for veracity, and if verified, the user's logon is permitted.

Various embodiments of the present invention have now been generally described in a non-limiting manner. It will be appreciated that these examples are merely illustrative of the present invention, which is defined by the following claims. Numerous variations, adaptations, and modifications will be apparent to those of ordinary skill in the art without departing from the spirit and scope of the present invention.

What is claimed is:

1. A method for allowing a user to securely log on to a host system via an electronic interface, comprising:

receiving, using a web server computer having a processor and memory, a request from the user at a user's computing device having a processor and memory and with a browser to access a website via the web server computer;

sending, using the web server computer, an encryption applet, a replay prevention ID, and a public key of a public/private key pair, the private key for which is known by a tamper-proof physical hardware security module of an application server computer having a processor and memory, to the browser of the user's computing device;

receiving, using the user's computing device, entry of the user's credentials into the encryption applet;

encrypting, using the user's computing device, the user's credentials with a symmetric key and encrypting, using the user's computing device, the symmetric key and replay prevention ID with the public key of the public/private key pair by the encryption applet;

sending, using the user's computing device, the symmetric key-encrypted user's credentials and public key-encrypted symmetric key and replay prevention ID via the web server computer to the application server computer from the browser of the user's computing device by the encryption applet without decrypting the symmetric key-encrypted user's credentials and public key-encrypted symmetric key and replay prevention ID at the web server computer and passing, using the user's computing device via the web server computer, the symmetric key-encrypted user's credentials and public key-encrypted symmetric key and replay prevention ID into the tamper-proof physical hardware security module of the application server computer;

decrypting, using the application server computer, internally within the tamper-proof physical hardware security module of the application server computer the public key-encrypted symmetric key and replay prevention ID with the private key of the public/private key pair known by the tamper-proof physical hardware security module of the application server computer and decrypting, using the application server computer, internally within the tamper-proof physical hardware security module of the application server computer the symmetric key-encrypted user's credentials with the decrypted symmetric key;

re-encrypting, using the application server computer, internally within the tamper-proof physical hardware security module of the application server computer the decrypted user's credentials with a new symmetric key known to an authentication server computer having a processor and memory and passing, using the application server computer, the re-encrypted user's credentials and decrypted replay prevention ID out of the tamper-proof physical hardware security module of the application server computer;

comparing, using the application server computer, the decrypted replay prevention ID with a clear-text version of the replay prevention ID retained by the application server computer, and if the decrypted replay prevention ID and the retained version are identical, sending, using the application server computer, the re-encrypted user's credentials to the authentication server computer for verification; and decrypting, using the authentication server computer, the re-encrypted user's credentials with the new symmetric key known to the authentication server computer, checking, using the authentication server computer, the decrypted user's credentials for veracity, and if verified, allowing, using the authentication server computer, the user's logon.

2. The method of claim 1, wherein sending the encryption applet to the user's browser further comprises sending a faceless encryption applet associated with the logon page to the user's browser.

3. The method of claim 1, wherein sending the encryption applet to the user's browser further comprises sending the encryption applet that is contained in a single class file containing functionality necessary to encrypt the user's credentials.

4. The method of claim 1, wherein sending the encryption applet to the user's browser further comprises sending an encryption applet sized to be downloaded to the user's browser on each logon.

5. The method of claim 1, wherein sending the encryption applet to the user's browser further comprises sending an encryption applet that persists on the user's browser for a duration of a current browser session.

6. The method of claim 1, wherein encrypting the user's credentials with the symmetric key further comprises generating the symmetric key by the encryption applet.

7. The method of claim 6, wherein generating the symmetric key further comprises generating the symmetric key by the encryption applet based on a random number generated by the encryption applet.

8. The method of claim 1, wherein encrypting the user's credentials with the symmetric key further comprises encrypting the user's credentials with a DES key to produce a cipherPIN.

9. The method of claim 1, wherein encrypting the symmetric key with the public key further comprises encrypting a DES key with the public key to produce a cipherKey.

10. The method of claim 1, wherein encrypting the user's credentials with the symmetric key and encrypting the symmetric key with the public key further comprises clearing working variables by the encryption applet to prevent retention of sensitive clear data.

11. The method of claim 1, wherein sending the symmetric key-encrypted user's credentials and public key-encrypted symmetric key to the application server computer further comprises sending the symmetric key-encrypted user's credentials and public key-encrypted symmetric key to the application server computer by the encryption applet via a portal application.

12. The method of claim 11, wherein sending the symmetric key-encrypted user's credentials and public key-encrypted symmetric key to the application server computer via the portal application further comprises encrypting and digitally signing the symmetric key-encrypted user's credentials and the public key-encrypted symmetric key within a single sign-on token and sending the token to the application server computer by the portal application.

13. The method of claim 12, wherein sending the symmetric key-encrypted user's credentials and public key-encrypted symmetric key to the application server computer via the portal application further comprises decrypting the single sign-on token and verifying that the token was received from the portal application as a trusted source.

14. A system for allowing a user to securely log on to a host system via an electronic interface, comprising:

a web server computer having a processor and memory, the web server computer processor being programmed for:
    receiving a request from the user at a user's computing device having a processor and memory and with a browser to access a website via a the web server computer; and
    sending an encryption applet, a replay prevention ID, and a public key of a public/private key pair, the private key for which is known by a tamper-proof physical hardware security module of an application server computer having a processor and memory, to the browser of the user's computing device;

the user's computing device processor being programmed for:
    receiving entry of the user's credentials into the encryption applet;
    encrypting the user's credentials with a symmetric key and encrypting the symmetric key and replay prevention ID with the public key of the public/private key pair by the encryption applet; and
    sending the symmetric key-encrypted user's credentials and public key-encrypted symmetric key and replay prevention ID via the web server computer to the application server computer from the browser of the user's computing device by the encryption applet without decrypting the symmetric key-encrypted user's credentials and public key-encrypted symmetric key and replay prevention ID at the web server computer and passing the symmetric key-encrypted user's credentials and public key-encrypted symmetric key and replay prevention ID into the tamper-proof physical hardware security module of the application server computer;

the application server computer processor being programmed for:

decrypting internally within the tamper-proof physical hardware security module of the application server computer the public key-encrypted symmetric key and replay prevention ID with the private key of the public/private key pair known by the tamper-proof physical hardware security module of the application server computer and decrypting internally within the tamper-proof physical hardware security module of the application server computer the symmetric key-encrypted user's credentials with the decrypted symmetric key;

re-encrypting internally within the tamper-proof physical hardware security module of the application server computer the decrypted user's credentials with a new symmetric key known to an authentication server computer having a processor and memory and for passing the re-encrypted user's credentials and decrypted replay prevention ID out of the tamper-proof physical hardware security module of the application server computer;

comparing the decrypted replay prevention ID with a clear-text version of the replay prevention ID retained by the application server computer, and if the decrypted replay prevention ID and the retained version are identical, for sending the re-encrypted user's credentials to the authentication server computer for verification; and the authentication server computer processor being programmed for:
  decrypting the re-encrypted user's credentials with the new symmetric key known to the authentication server computer, checking the decrypted user's credentials for veracity, and if verified, allowing the user's logon.

15. A method for allowing a user to securely log on to a host system via an electronic interface, comprising:

receiving, using a web server computer having a processor and memory, a request from the user at a user's computing device having a processor and memory and with a browser to access an application server computer program executing on an application and authentication server computer having a processor and memory via the web server computer;

sending, using the web server computer, an encryption applet, a replay prevention ID, and a public key of a public/private key pair of an authentication server computer program executing on the application and authentication server computer that is co-resident with the application server computer program executing on the application and authentication server computer to the user's browser by the application server computer program executing on the application and authentication server computer;

receiving, using the user's computing device, entry of the user's credentials into the encryption applet;

encrypting, using the user's computing device, the user's credentials with a symmetric key and encrypting, using the user's computing device, the symmetric key and replay prevention ID with the public key of the public/private key pair of the authentication server by the encryption applet;

sending, using the user's computing device, the symmetric key-encrypted user's credentials and public key-encrypted symmetric key and replay prevention ID via the web server computer to the application server computer program executing on the application and authentication server computer from the browser of the user's computing device without decrypting the symmetric key-encrypted user's credentials and public key-encrypted symmetric key and replay prevention ID at the web server computer;

passing, using the application and authentication server computer, the symmetric key-encrypted user's credentials and public key-encrypted symmetric key and replay prevention ID by the application server computer program executing on the application and authentication server computer to the authentication server computer program executing on the application and authentication server computer without decrypting the key-encrypted user's credentials and public key-encrypted symmetric key and replay prevention ID at the application server computer program executing on the application and authentication server computer;

decrypting, using the application and authentication server computer, the public key-encrypted symmetric key and replay prevention ID with the private key of the public/private key pair of the authentication server computer program executing on the application and authentication server computer and decrypting, using the application and authentication server computer, the symmetric key-encrypted user's credentials with the decrypted symmetric key by a tamper-proof physical hardware security module of the authentication server computer program executing on the application and authentication server computer; and checking, using the application and authentication server computer, the decrypted replay prevention ID and the decrypted user's credentials for veracity, and if verified, allowing, using the application and authentication server computer, the user's logon, by the authentication server computer program executing on the application and authentication server computer.

16. A method for allowing a user to securely log on to a host system via an electronic interface, comprising:

receiving, using a web server computer having a processor and memory, a request from the user at a user's computing device having a processor and memory and with a browser to access an application server computer having a processor and memory via a the web server computer;

sending, using the web server computer, an encryption applet, a replay prevention ID, and a public key of a public/private key pair, the private key for which is known by a tamper-proof physical hardware security module of the application server computer to the browser of the user's computing device by the application server computer via the web server computer;

receiving, using the user's computing device, entry of the user's credentials into the encryption applet;

encrypting, using the user's computing device, the user's credentials with a symmetric key and encrypting, using the user's computing device, the symmetric key and replay prevention ID with the public key of the public/private key pair by the encryption applet;

sending, using the user's computing device, the symmetric key-encrypted user's credentials and the public key-encrypted symmetric key and replay prevention ID via the web server computer to the application server computer from the browser of the user's computing device without decrypting the symmetric key-encrypted user's credentials and public key-encrypted symmetric key and replay prevention ID by the web server computer and passing, via the web server computer, the symmetric key-encrypted user's credentials and public key-encrypted symmetric key and replay prevention ID into the tamper-proof physical hardware security module of the application server computer;

decrypting, using the application server computer, internally within the tamper-proof physical hardware security module of the application server computer the public key-encrypted symmetric key and replay prevention ID with the private key of the public/private key pair known by the tamper-proof physical hardware security module of the application server computer and decrypting, using the application server computer, internally within the tamper-proof physical hardware security module of the application server computer the symmetric key-encrypted user's credentials with the decrypted symmetric key;

re-encrypting, using the application server computer, internally within the tamper-proof physical hardware security module of the application server computer the decrypted user's credentials with a new symmetric key known to an authentication server computer having a processor and memory and passing, using the application server computer, the re-encrypted user's credentials and decrypted replay prevention ID out of the tamper-proof physical hardware security module of the application server computer:

comparing, using the application server computer, the decrypted replay prevention ID with a clear-text version of the replay prevention ID retained by the application server computer, and if the decrypted replay prevention ID and the retained version are identical, sending, using the application server computer, the re-encrypted user's credentials to the authentication server computer by the application server computer for verification; and decrypting, using the authentication server computer, the re-encrypted user's credentials with the new symmetric key known to the authentication server computer, checking, using the authentication server computer, the decrypted user's credentials for veracity, and if verified, allowing, using the authentication server computer, the user's logon.

\* \* \* \* \*